(12) United States Patent
Hwang et al.

(10) Patent No.: US 12,306,793 B2
(45) Date of Patent: May 20, 2025

(54) LOGICAL IMAGING APPARATUS AND METHOD FOR DIGITAL FORENSIC TRIAGE

(71) Applicant: ELECTRONICS AND TELECOMMUNICATIONS RESEARCH INSTITUTE, Daejeon (KR)

(72) Inventors: Hyun-Uk Hwang, Daejeon (KR); Seung-Yong Lee, Daejeon (KR); Joong-Soo Han, Daejeon (KR); Jung-Hoon Oh, Daejeon (KR); Jun-Su Kim, Daejeon (KR); Ki-Bom Kim, Daejeon (KR); Won-Ho Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/868,930

(22) Filed: Jul. 20, 2022

(65) Prior Publication Data

US 2023/0024682 A1    Jan. 26, 2023

(30) Foreign Application Priority Data

Jul. 21, 2021  (KR) .................. 10-2021-0096053
Jul. 20, 2022  (KR) .................. 10-2022-0089529

(51) Int. Cl.
    *G06F 16/00*    (2019.01)
    *G06F 16/10*    (2019.01)
    (Continued)

(52) U.S. Cl.
    CPC ......... *G06F 16/152* (2019.01); *G06F 16/10* (2019.01); *G06F 16/2255* (2019.01);
    (Continued)

(58) Field of Classification Search
    CPC ...... G06F 16/152; G06F 16/54; G06F 21/552; G06F 21/53; G06F 16/10; G06F 16/434;
    (Continued)

(56) References Cited

U.S. PATENT DOCUMENTS 7,779,032 B1 *  8/2010  Garfinkel .............. G06F 16/10
                                              707/823
9,003,143 B1 *  4/2015  Barnes ............... G06F 11/1458
                                              711/162

(Continued)

FOREIGN PATENT DOCUMENTS

CA    3007380 A1 *  6/2018
EP    4080437 A1 * 10/2022

(Continued)

OTHER PUBLICATIONS

Darren Quick et al., "Big forensic data reduction digital forensic images and electronic evidence", Cluster Comput (2016) 19: pp. 723-740.*

(Continued)

*Primary Examiner* — Srirama Channavajjala
(74) *Attorney, Agent, or Firm* — LRK PATENT LAW FIRM

(57) ABSTRACT

Disclosed herein are a logical imaging apparatus and method for digital forensic triage. The logical imaging method for digital forensic triage includes receiving files selected as a digital evidence target, creating a logical imaging file, inside of which is formatted in a predetermined file system structure, recording the selected files in accordance with the file system structure of the created logical imaging file, and storing selected file list information about a list of the recorded selected files, and creating a separate selected list information file and a separate logical imaging summary file outside the logical imaging file.

8 Claims, 7 Drawing Sheets

(51) Int. Cl.
*G06F 16/14* (2019.01)
*G06F 16/22* (2019.01)
*G06F 16/40* (2019.01)
*G06F 16/432* (2019.01)
*G06F 16/483* (2019.01)
*G06F 16/50* (2019.01)
*G06F 16/54* (2019.01)
*G06F 16/78* (2019.01)
*G06F 21/53* (2013.01)
*G06F 21/55* (2013.01)
*G06V 40/10* (2022.01)
*G06V 40/50* (2022.01)

(52) U.S. Cl.
CPC ............ *G06F 16/40* (2019.01); *G06F 16/434* (2019.01); *G06F 16/483* (2019.01); *G06F 16/50* (2019.01); *G06F 16/54* (2019.01); *G06F 16/78* (2019.01); *G06F 21/53* (2013.01); *G06F 21/552* (2013.01); *G06V 40/155* (2022.01); *G06V 40/53* (2022.01)

(58) Field of Classification Search
CPC ........ G06F 16/40; G06F 16/483; G06F 16/50; G06F 16/78; G06F 16/2255; G06F 16/383; G06V 40/155; G06V 40/50; H04L 9/3242; H04L 9/3252
USPC .......................................................... 707/758
See application file for complete search history.

(56) References Cited

U.S. PATENT DOCUMENTS

| | | | | |
|---|---|---|---|---|
| 2007/0198606 | A1* | 8/2007 | Memon | .................... G06F 21/00 |
| 2009/0094203 | A1* | 4/2009 | Kim | ...................... G06F 16/148 |
| 2011/0191533 | A1* | 8/2011 | Coulter | .................... G06F 16/13 |
| | | | | 711/112 |
| 2012/0290578 | A1 | 11/2012 | Morimoto et al. | |
| 2014/0157407 | A1* | 6/2014 | Krishnan | ................ G06F 21/53 |
| | | | | 726/22 |
| 2015/0212758 | A1* | 7/2015 | Lee | ........................ G06F 21/552 |
| | | | | 710/74 |
| 2015/0339196 | A1* | 11/2015 | Greetham | ............... G06F 16/13 |
| | | | | 707/653 |
| 2018/0373894 | A1* | 12/2018 | Kim | ...................... H04L 9/3242 |

FOREIGN PATENT DOCUMENTS

| | | | | |
|---|---|---|---|---|
| KR | 19980032894 | * | 7/1998 | .......... G06F 16/152 |
| KR | 10-2009-0001471 A | | 1/2009 | |
| KR | 10-2009-0065237 A | | 6/2009 | |
| KR | 10-2013-0049437 A | | 5/2013 | |
| KR | 10-2013-0095171 A | | 8/2013 | |
| KR | 10-1497067 B1 | | 3/2015 | |
| WO | WO2016101006 A1 | * | 6/2016 | |

OTHER PUBLICATIONS

Rayan Sulaiman Khalaf et al., "Digital ForensicsFocusing on Image Forensics", IEEE, 2019, pp. 1-5.*
Hee-Sung Tak et al, "A Study on a Model Frame for the Integration of Digital Forensic Processes", Korean Institute of Criminology(KIC), (Dec. 31, 2016).
Tae Lim Lee, "Reliability Verification of Evidence Analysis Tools for Digital Forensics", Interdisciplinary Program of Information Security, The Graduate School, Pukyong National University (Feb. 28, 2010).

* cited by examiner

| Table | | | | |
|---|---|---|---|---|
| ↑ Checked (0/3) | | | | |
| ☐ Name | Extension | Signature | Deleted | Modification Time |
| ☐ 1 VA_X.tmp | tmp | | TRUE | 2021/04/20 19:33:04 UTC+09:00 |
| ☐ 2 VA_Y.tmp | tmp | | TRUE | 2021/04/20 19:33:04 UTC+09:00 |
| ☐ 3 VA_Z.tmp | tmp | | TRUE | 2021/04/20 19:33:06 UTC+09:00 |

FIG. 7

LOGICAL IMAGING APPARATUS AND METHOD FOR DIGITAL FORENSIC TRIAGE

CROSS REFERENCE TO RELATED APPLICATIONS

This application claims the benefit of Korean Patent Application Nos. 10-2021-0096053, filed Jul. 21, 2021 and 10-2022-0089529, filed Jul. 20, 2022, which are hereby incorporated by reference in their entireties into this application.

BACKGROUND OF THE INVENTION

1. Technical Field

The following embodiments relate to digital forensic technology.

2. Description of Related Art

In digital forensic fields, although a physical imaging method for imaging the entirety of an existing disk has been prioritized, a logical imaging method for selecting or sorting only files required for investigation, inspection, or the like in conformity with the changing trend with the flow of the time has become a very important technical flow.

According to Article 106 (3) of the Criminal Procedure Act and the Constitution of the Republic of Korea, as the self-determination right to personal information has emerged as the constitutional justice, collection of only evidence related to a (crime) case in the form of selective seizure is required by law upon handing digital evidence. Therefore, an investigator must generate an evidence image by selecting only evidence related to the corresponding case in the scene of search and seizure, and the result of the image generated in this way must be configured to guarantee the reliability and integrity of the evidence image.

A forensic tool automatically generates such a result, and the result is provided to a suspect (witness) in association with a report, and thus an investigator and the suspect must mutually trust the result.

OpenText EnCase and AccessData FTK, which are representative forensic tools, use their own formats in which only selected files are imaged. Although such conventional forensic tools support a logical imaging method for selection, they must use only their own formats, and thus the formats are not compatible with those of other forensic tools, with the result that the conventional forensic tools cannot be universally utilized.

SUMMARY OF THE INVENTION

An embodiment is intended to support protection of personal information of people and investigation rights by logically imaging a file selected as digital evidence.

An embodiment is intended to support a logical imaging method for triage and enable the logical imaging method to be universally utilized in other forensic tools.

An embodiment is intended to provide trusted data both to a forensic investigator and to a suspect, thus guaranteeing the reliability of evidence that is selected and seized during a search and seizure in a scene.

An embodiment is intended to provide integrity, reliability, and identification when a selected imaging file is subsequently utilized as evidence in the court.

In accordance with an aspect, there is provided a logical imaging method for digital forensic triage, including receiving files selected as a digital evidence target, creating a logical imaging file, inside of which is formatted in a predetermined file system structure, recording the selected files in accordance with the file system structure of the created logical imaging file, and storing selected file list information about a list of the recorded selected files, and creating a separate selected list information file and a separate logical imaging summary file outside the logical imaging file.

Storing the selected file list information may include creating a logical imaging file corresponding to a total size of the selected files, formatting the created logical imaging file by loading a predetermined system configuration into the created logical imaging file, storing the selected files in the formatted logical imaging file, storing information about the list of the stored selected files, and calculating and generating first hash values for respective selected files and a second hash value for whole contents of the selected files.

The logical imaging file may include a metadata storage area and an actual data storage area for the selected files.

Storing the selected files in the formatted logical imaging file may include repeatedly performing an operation of generating and storing metadata based on the information about the selected files and storing data in the data area, on the selected files.

Storing the selected files in the formatted logical imaging file may further include when loaded data is a directory, creating a directory and loading a subsequent file.

The selected list information file may store the selected file list information identical to that recorded in the logical imaging file, the first hash values for respective selected files, and a third hash value for the logical imaging file.

The logical imaging summary file may store basic information about a case, the third hash value for the logical imaging file, the second hash value for whole contents of the selected files, and a fourth hash value for the selected list information file.

The logical imaging method may further include creating a report file, in which completion of logical imaging is recorded, based on the logical imaging file, the selected list information file, and the logical imaging summary file.

The report file may be configured such that principal information of a target system, which includes system information, device information, and artifact information, and information about an evidence image and extraction list, which includes a logical imaging time, the first hash values for respective selected files, the second hash value for whole contents of the selected files, and the fourth hash value for the selected list information file, are recorded in the report file.

The selected list information file and the report file may be provided to a suspect, integrity of the logical imaging file and the logical imaging summary file may be verified using information recorded in the selected list information file, which include selected file list information identical to that recorded in the logical imaging file, the first hash values for respective selected files, and the third hash value for the logical imaging file, and integrity of the logical imaging file, the selected list information file, and the logical imaging summary file may be verified using information recorded in the report file, which include the third hash value for the logical imaging file, the second hash value for whole contents of the selected files, and the fourth hash value for the selected list information file.

In accordance with another aspect, there is provided a logical imaging apparatus for digital forensic triage, including memory for storing at least one program, and a processor for executing the program, wherein the program is configured to perform receiving files selected as a digital evidence target, creating a logical imaging file, inside of which is formatted in a predetermined file system structure, recording the selected files in accordance with the file system structure of the created logical imaging file, and storing selected file list information about a list of the recorded selected files, and creating a separate selected list information file and a separate logical imaging summary file outside the logical imaging file.

The program may be configured to perform, in storing the selected file list information creating a logical imaging file corresponding to a total size of the selected files, formatting the created logical imaging file by loading a predetermined system configuration into the created logical imaging file, storing the selected files in the formatted logical imaging file, storing information about the list of the stored selected files, and calculating and generating first hash values for respective selected files and a second hash value for whole contents of the selected files.

The logical imaging file may include a metadata storage area and an actual data storage area for the selected files.

The program may be configured to perform, in storing the selected files in the formatted logical imaging file repeatedly performing an operation of generating and storing metadata based on the information about the selected files and storing data in the data area, on the selected files.

The program may be configured to further perform, in storing the selected files in the formatted logical imaging file when loaded data is a directory, creating a directory and loading a subsequent file.

The selected list information file may store the selected file list information identical to that recorded in the logical imaging file, the first hash values for respective selected files, and a third hash value for the logical imaging file.

The logical imaging summary file may store basic information about a case, the third hash value for the logical imaging file, the second hash value for whole contents of the selected files, and a fourth hash value for the selected list information file.

The program may be configured to further perform creating a report file, in which completion of logical imaging is recorded, based on the logical imaging file, the selected list information file, and the logical imaging summary file.

The report file may be configured such that principal information of a target system, which includes system information, device information, and artifact information, and information about an evidence image and extraction list, which includes a logical imaging time, the first hash values for respective selected files, the second hash value for whole contents of the selected files, and the fourth hash value for the selected list information file, are recorded in the report file.

The selected list information file and the report file may be provided to a suspect, integrity of the logical imaging file and the logical imaging summary file may be verified using information recorded in the selected list information file, which include selected file list information identical to that recorded in the logical imaging file, the first hash values for respective selected files, and the third hash value for the logical imaging file, and integrity of the logical imaging file, the selected list information file, and the logical imaging summary file may be verified using information recorded in the report file, which include the third hash value for the logical imaging file, the second hash value for whole contents of the selected files, and the fourth hash value for the selected list information file.

BRIEF DESCRIPTION OF THE DRAWINGS

The above and other objects, features and advantages of the present invention will be more clearly understood from the following detailed description taken in conjunction with the accompanying drawings, in which:

FIG. 7 is a diagram illustrating an example in which it is indicated whether there is a deleted file according to an embodiment.

DESCRIPTION OF THE PREFERRED EMBODIMENTS

Figure 1:
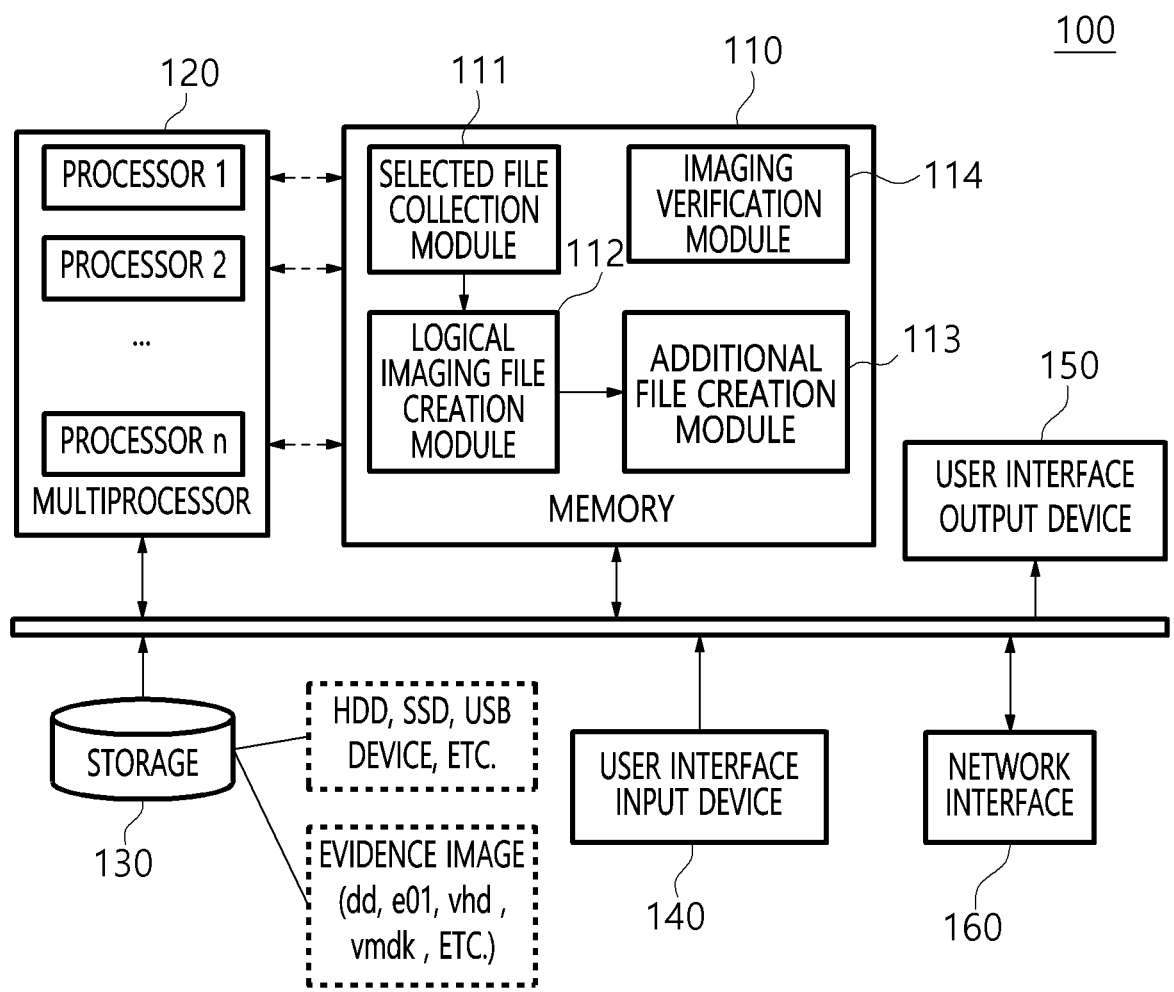
FIG. 1 is a schematic block configuration diagram of a logical imaging apparatus for digital forensic triage according to an embodiment.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

It should be noted that an investigator and an analyzer described in the present specification are only examples of a user who may use embodiments of the present invention, and the range of the user in the present invention is not limited thereto.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, a logical imaging apparatus and method for digital forensic triage according to embodiments will be described in detail with reference to FIGS. 1 to 7.

FIG. 1 is a schematic block configuration diagram of a logical imaging apparatus for digital forensic triage according to an embodiment.

Referring to FIG. 1, a logical imaging apparatus 100 for digital forensic triage (hereinafter referred to as an 'apparatus') may be implemented in a computer system such as a computer-readable storage medium.

The apparatus 100 may include memory 110, a processor 120, storage 130, a user interface input device 140, and a user interface output device 150, which communicate with each other through a bus. The apparatus 100 may further include a network interface 160 connected to a network.

The processor 120 may be a Central Processing Unit (CPU) or a semiconductor device for executing programs or processing instructions stored in the memory 110 or the storage 130.

The processor 120 according to an embodiment may have the form of a multiprocessor, and may operate the modules of a program loaded into the memory 110 in a multi-thread form.

Each of the memory 110 and the storage 130 may be a storage medium including at least one of a volatile medium, a nonvolatile medium, a removable medium, a non-removable medium, a communication medium, or an information delivery medium, or a combination thereof. For example, the memory 110 may include Read-Only Memory (ROM) or Random Access Memory (RAM).

In accordance with an embodiment, a program for performing logical imaging for digital forensic triage may include a selected file collection module 121 for collecting files selected by an investigator or an analyzer, a logical imaging file creation module 122 for logically imaging the selected files so as to generate an evidence image from the selected files, and an additional file creation module 123 for creating a selected list information file and an entire logical imaging summary file. The program may further include an image verification module 124 for determining and verifying the reliability of integrity of logical imaging. A detailed operation of the program including these modules will be described later with reference to FIGS. 2 to 5.

The storage 130 stores the logs and results output from the program in the form of a file, and may include a hard disk drive (HDD), a solid state drive (SSD) or a Universal Serial Bus (USB) device that is the target of selective imaging (triage imaging), and an evidence image file, which is created in the form of a file and stored in a disk and has an extension such as 'dd', 'e01', 'vhd' or 'vmdk'.

The disk or evidence image stored in the storage 130 may be provided or the selected file information acquired by the investigator or analyzer may be input, through the user interface input device 140 according to an embodiment.

Further, the logical imaging file created by the program may be output (displayed) in the form of a visual screen via the user interface output device 150. The investigator may check the results of logical imaging via the user interface output device 150.

Meanwhile, the program according to an embodiment may be remotely operated through the network interface 160.

Figure 2:
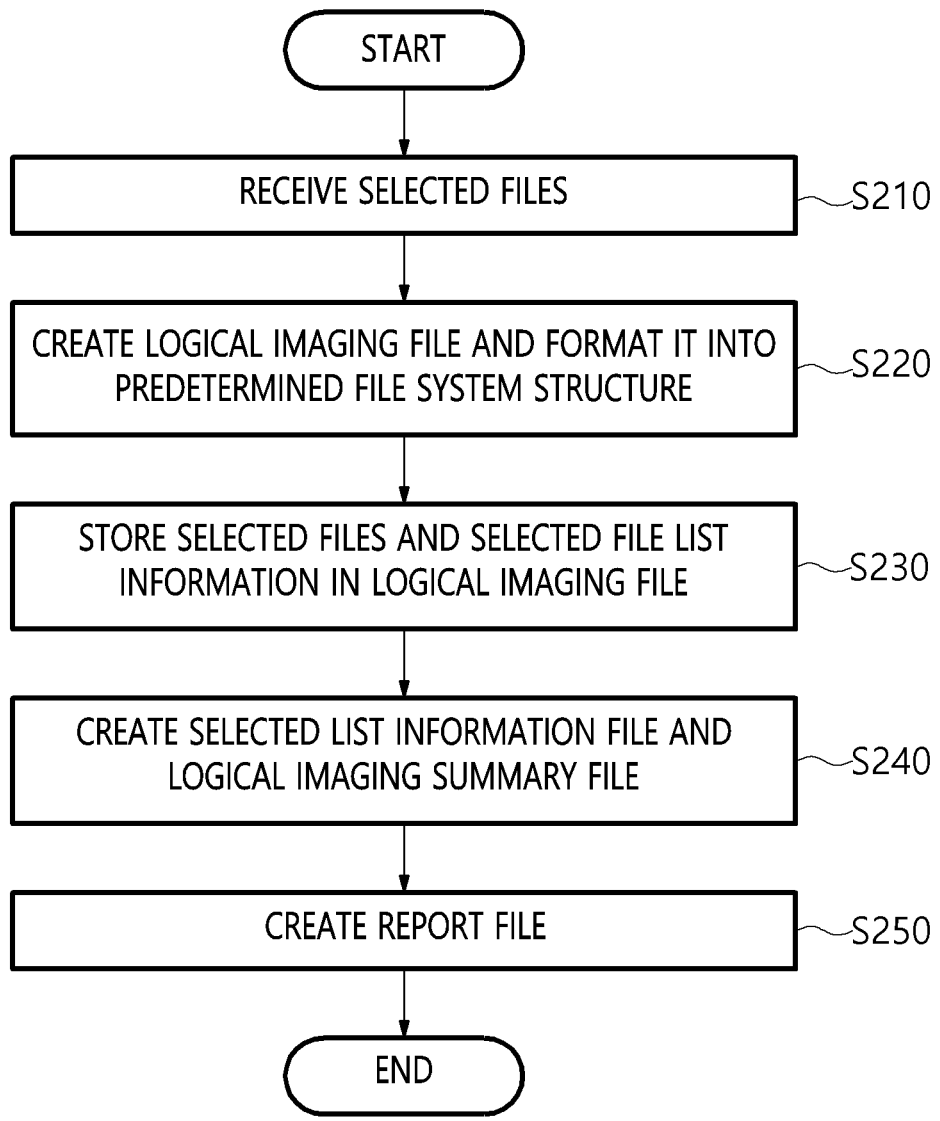
FIG. 2 is a flowchart for explaining a logical imaging method for digital forensic triage according to an embodiment.
Figure 3:
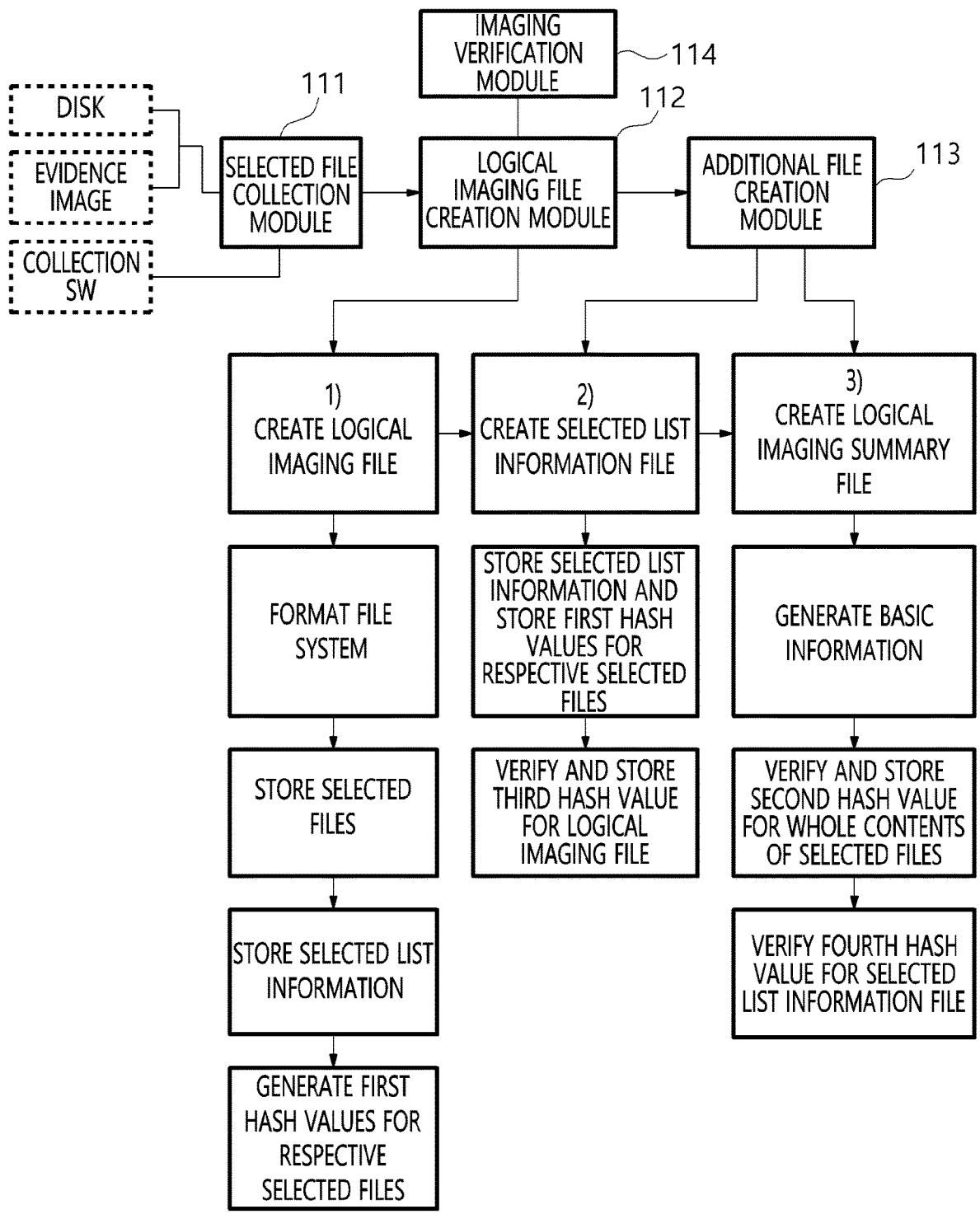
FIG. 3 is a diagram illustrating the configuration of each of files created from logical imaging for digital forensic triage according to an embodiment.

FIG. 2 is a flowchart for explaining a logical imaging method for digital forensic triage according to an embodiment, and FIG. 3 is a diagram illustrating the configuration of each of files created from logical imaging for digital forensic triage according to an embodiment.

Referring to FIG. 2, the logical imaging method for digital forensic triage according to an embodiment may include receiving files selected as a digital evidence target at step S210, creating a logical imaging file, the inside of which is formatted in a predetermined file system structure, recording the selected files to correspond to the file system structure of the created logical imaging file, and storing information about a list of the recorded selected files (i.e., selected list information) at steps S220 and S230, and creating a separate selected list information file and a separate logical imaging summary file outside the logical imaging file at step 240.

That is, referring to FIG. 3, in an embodiment, a logical imaging function may be performed by creating a total of three files including the logical imaging file, the selected list information file, and the logical imaging summary file.

Here, the extension of the created logical imaging file may be '.dd' or '.d01', the extension of the selected list information file may be '.CSV', the extension of the logical imaging summary file may be '.txt'. However, when a resulting file is partitioned and created in logical imaging, the extension of the corresponding files may sequentially increase in the form of, for example, .d01, d02, and d03. Furthermore, the selected list information file and the logical imaging summary file may have other extensions if necessary.

Further, referring to FIG. 3, step S210 according to an embodiment may be performed by the selected file collection module 111, wherein the selected files may be received through at least one of a disk, an evidence image, or external collection software (SW), or a combination thereof.

Referring to FIG. 3, steps S220 and S230 according to an embodiment may be performed by the logical imaging file creation module 112, wherein the selected list information, in which selected file information is recorded, may be created and stored in the form of "snapshot.txt" in a formatted logical imaging file.

Referring to FIG. 3, step S240 according to an embodiment may be performed by the additional file creation module 113, wherein additional files may be created based on the created logical imaging file.

Here, as illustrated in FIG. 3, the selected list information about the selected files, which is identical to that recorded in the logical imaging file, may be recorded in the selected list information file.

Finally, as illustrated in FIG. 3, basic information about each case may be generated and recorded in the logical imaging summary file.

Meanwhile, referring back to FIG. 2, the logical imaging method for digital forensic triage according to an embodiment may further include creating a report file in which completion of logical imaging is recorded, based on the logical imaging file, the selected list information file, and the logical imaging summary file, at step S250. Here, the extension of the report file may be '.html' or '.pdf'. Further, the report file may have other extensions if necessary.

When the above-described logical imaging method for digital forensic triage according to the embodiment is performed, it may be implemented such that all steps are automated through one setup operation in order to minimize the intervention of the investigator, and thus the investigator only needs to subsequently check the results of logical imaging via the user interface output device 150.

Furthermore, the embodiment may provide an integrity guarantee technique using a legal evidence image by creating selected files and separate configuration files required for integrity verification in a file system, as separate files, inside and outside the imaging file. That is, the logical imaging file, the selected list information file, the logical imaging summary file, and the report file, created as described above, may be suitably provided both to the investigator and a witness (suspect), and may then be utilized to verify the integrity of the selected files and the reliability of the investigation process in scene investigation.

For this operation, referring to FIG. 3, the logical imaging method for digital forensic triage according to an embodiment may further include the step of generating hash values for integrity verification for the logical imaging file. Here, the generated hash values may include first hash values for respective selected files and a second hash value for the whole contents of the created logical imaging file.

Further, referring to FIG. 3, the logical imaging method for digital forensic triage according to an embodiment may further include the step of recalculating first hash values for required for verification of respective selected files and storing the recalculated first hash values in the selected list information file.

Furthermore, the logical imaging method for digital forensic triage according to an embodiment may further include the step of calculating a third hash value required for verification of the created logical imaging file, and storing the calculated third hash value in the selected list information file.

Furthermore, referring to FIG. 3, the logical imaging method for digital forensic triage according to an embodiment may further include the step of calculating a third hash value required for verification of the logical imaging file and a fourth hash value for the selected list information file and storing the third hash value and the fourth hash value in the logical imaging summary file.

Further, the report file may be configured such that principal information of a target system, which includes system information, device information, and artifact information, and evidence image and extraction list information, which includes a logical imaging time, the third hash value for the logical imaging file, the second hash value for the whole contents of the selected files, and the fourth hash value for the selected list information file, are recorded in the report file.

Next, steps S220 and S230 of creating the logical imaging file according to an embodiment will be described in detail below.

Figure 4:
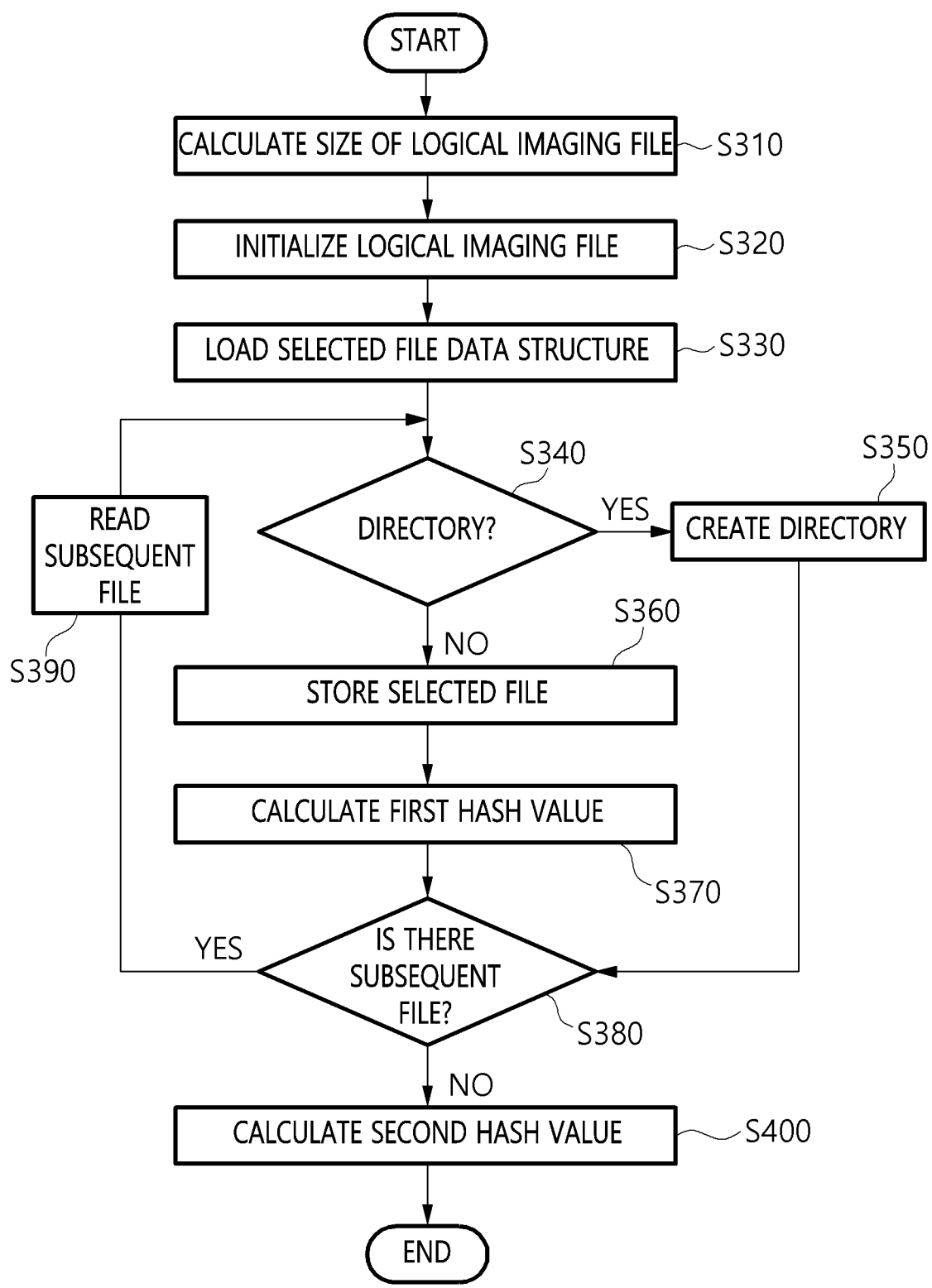
FIG. 4 is a flowchart illustrating the step of creating a logical imaging file according to an embodiment.
Figure 5:
FIG. 5 is a diagram illustrating the internal structure of a logical imaging file according to an embodiment.

FIG. 4 is a flowchart illustrating the step of creating a logical imaging file according to an embodiment, and FIG. 5 is a diagram illustrating the internal structure of a logical imaging file according to an embodiment.

Referring to FIG. 4, the apparatus 100 calculates the size of a logical imaging file in which selected files can be stored by calculating the total capacity of files selected from an input disk or an evidence image at step S310.

Thereafter, the apparatus 100 may load and initialize a predefined file system configuration into the logical imaging file in the form of a volume at step S320.

Here, as the predetermined file system, a well-known file system such as exFAT, FAT32, or NTFS, or an internal file system may be implemented.

Referring to FIG. 5, the logical imaging file may include a metadata storage area for the selected files and an actual data storage area.

The apparatus 100 sequentially loads the selected files by loading a data structure in which the selected files are stored so as to store the selected files in the formatted logical imaging file at step S330.

Here, when the loaded data is a directory at step S340, the apparatus 100 may create a directory at step S350, and proceeds to step S380 to load a subsequent file.

On the other hand, when the loaded data is not a directory at step S340, the apparatus 100 generates metadata based on information about the loaded selected file, stores the generated metadata in the metadata storage area, such as that illustrated in FIG. 5, and stores data in the data area at step S360.

Thereafter, the apparatus 100 calculates a first hash value for the stored selected file at step S370.

Next, the apparatus 100 reads a subsequent file at step S390 depending on whether there is a subsequent file at step S380, and repeatedly performs steps S340 to S380.

Thereafter, the apparatus 100 calculates a second hash value for the whole contents of selected files at step S400.

The logical imaging file, the selected list information file, the logical imaging summary file, and the report file, which are created as described above, are suitably provided to an investigator and a witness (suspect), and may then be utilized to verify the integrity of the selected files and the reliability of the investigation process in scene investigation. This procedure will be described below with reference to FIG. 6.

Figure 6:
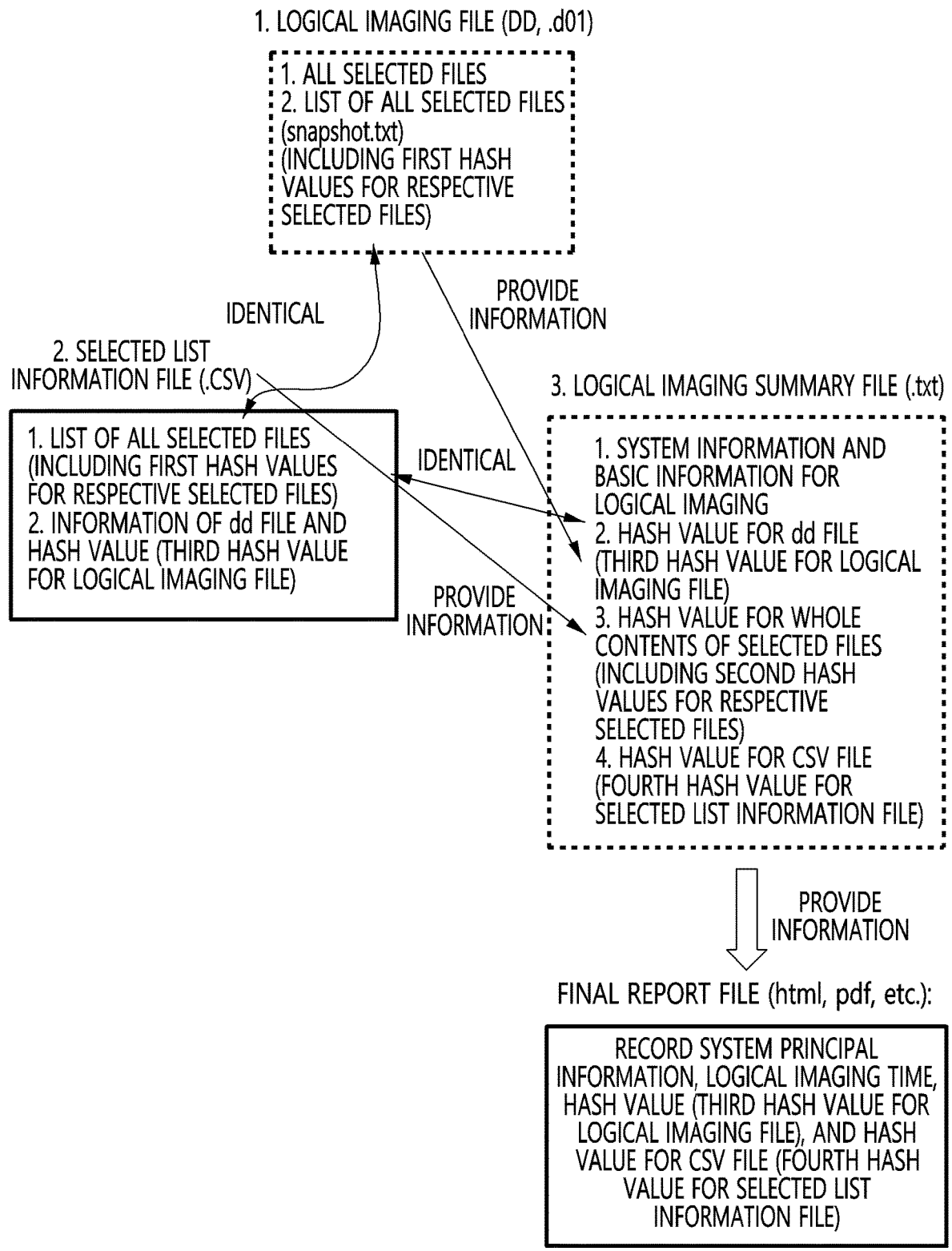
FIG. 6 is a diagram illustrating relationships between created files according to an embodiment.

FIG. 6 is a diagram illustrating relationships between created files according to an embodiment.

Here, an investigator may possess all of the files illustrated in FIG. 6, and only a selected list file and a report file may be provided to a witness (suspect).

However, although only the selected list file and the report file are provided to the witness (suspect), result files created by the logical imaging method for forensic triage according to the embodiment are designed to mutually track result values, thus verifying the reliability and integrity of logical imaging.

First, selected list information stored in 'snapshot.txt' in a logical imaging file and a storage list in a selected list information file may have the same contents. Further, in the selected list information file, respective first hash values for selected files stored in the logical imaging file are stored. Therefore, result values are mutually tracked between the logical imaging file and the selected list information file, and thus reliability and integrity may be verified.

Next, the logical imaging summary file may store a third hash value for the logical imaging file, a second hash value for the whole contents of selected files, and a fourth hash value for the selected list information file. Therefore, result values may be mutually tracked between the logical imaging summary file and each of the logical imaging file, and the selected list information file, and thus reliability and integrity may be verified.

Finally, the final report file may store the principal information of the target system, which includes system information, device information, and artifact information, logical imaging time, the third hash value for the logical imaging file, and the fourth hash value for the selected list information file, based on the result values of the three files. Thereby, result values may be mutually tracked between the final report file and each of the three other files, and thus reliability and integrity may be verified.

Therefore, even if only the selected list information file and the final report file are provided to the suspect (witness), presence or non-presence of an abnormality may be determined when file contents are subsequently changed.

Meanwhile, among files that can be selected as a digital evidence target, the situation of file deletion may be captured. For this, the apparatus 100 according to an embodiment may perform logical imaging by indicating whether there is a deleted file in logical imaging.

FIG. 7 is a diagram illustrating an example in which it is indicated whether there is a deleted file according to an embodiment.

That is, as illustrated in FIG. 7, when a selected file according to an embodiment is deleted, a flag such as 'TRUE' is displayed, thus enabling presence or non-presence of a deleted file to be identified.

In accordance with embodiments, logical imaging is performed on files selected as digital evidence, thus supporting protection of personal information of people and investigation rights.

In accordance with embodiments, a selective imaging (triage imaging) scheme may be supported, and may be universally utilized even in other forensic tools. Furthermore, a read function for selected imaging files may be supported, and logical imaging may also be utilized even if a forensic tool is not used.

In accordance with embodiments, trusted data may be provided both to a forensic investigator and to a witness (suspect), and thus the reliability of evidence that is selected and seized in a search and seizure process in the scene may be guaranteed.

The embodiments may provide integrity, reliability, and identification when selected imaging files are subsequently used as evidence in the court.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

DESCRIPTION OF REFERENCE NUMERALS

100: Logical Imaging Apparatus 110: Memory 111: Selected File Collection Module 112: Logical Imaging File Creation Module 113: Additional File Creation Module 114: Imaging Verification Module 120: Processor 130: Storage 140: User Interface Input Device 150: User Interface Output Device 160: Network Interface

What is claimed is:

1. A logical imaging method for digital forensic triage by an apparatus, the apparatus including a processor and a memory operably coupled to the processor, wherein the memory stores program instructions to be executed by the processor, the method comprising:
   receiving files selected as a digital evidence target in the computer;
   creating, by the processor, a logical imaging file by logically imaging the selected files so as to generate digital evidence images from the selected files, inside of which is formatted in a predetermined file system structure, recording the selected files in accordance with the file system structure of the created logical imaging file, and storing selected file list information about a list of the recorded selected files; and
   creating, by the processor, a separate selected list information file and a separate logical imaging summary file outside the logical imaging file,
   creating, by the processor, a report file, in which completion of logical imaging is recorded, based on the logical imaging file, the selected list information file, and the logical imaging summary file; and
   outputting the logical imaging file to a user interface output device for analysis by a user,
   wherein storing the selected file list information by the processor comprises:
   creating a logical imaging file corresponding to a total size of the selected files;
   formatting the created logical imaging file by loading a predetermined system configuration into the created logical imaging file;
   storing the selected files in the formatted logical imaging file and information about the list of the stored selected files; and
   generating hash values for integrity verification of the logical imaging files, wherein the hash values comprise a first hash value for respective selected files and a second hash value for whole contents of the selected files,
   wherein:
   the logical imaging file, the selected list information file, the logical imaging summary file and the report file are provided to an investigator, and
   the selected list information file and the report file are provided to a suspect,
   integrity of the logical imaging file and the logical imaging summary file is verified using information recorded in the selected list information file, which include selected file list information identical to that recorded in the logical imaging file and the first hash values for respective selected files,
   integrity of the logical imaging file, the selected list information file, and the logical imaging summary file is verified using information recorded in the report file, which include a third hash value for the logical imaging file, the second hash value for whole contents of the selected files, and a fourth hash value for the selected list information file,
   the predetermined file system structure is one among the formats including exFAT, FAT32, or NTFS,
   the extension of the created logical imaging file is .dd or .d01, and
   the selected list information, in which selected file information is recorded, is created and stored in the form of snapshot.txt in a formatted logical imaging file,
   wherein the report file is configured such that principal information of a target system, which includes system information, device information, and artifact information, and information about an evidence image and extraction list, which includes a logical imaging time, the third hash value for the logical imaging file, the second hash value for whole contents of the selected files, and the fourth hash value for the selected list information file, are recorded in the report file.

2. The logical imaging method of claim 1, wherein the logical imaging file includes a metadata storage area and an actual data storage area for the selected files.

3. The logical imaging method of claim 2, wherein storing the selected files in the formatted logical imaging file comprises:
   repeatedly performing, by the processor, an operation of generating and storing metadata in the metadata storage area and storing data in the actual data area based on selection of on the selected files.

4. The logical imaging method of claim 1, wherein the logical imaging summary file stores basic information about a case, the third hash value for the logical imaging file, the second hash value for whole contents of the selected files, and the fourth hash value for the selected list information file.

5. A logical imaging apparatus for digital forensic triage, logical imaging apparatus including a processor and a memory operably coupled to the processor, wherein the memory stores program instructions to be executed by the processor, comprising:
a user interface output device for displaying results of the digital forensic triage;
wherein the processor is configured to perform:
receiving files selected as a digital evidence target;
creating a logical imaging file by logically imaging the selected files so as to generate digital evidence images from the selected files, inside of which is formatted in a predetermined file system structure, recording the selected files in accordance with the file system structure of the created logical imaging file, and storing selected file list information about a list of the recorded selected files; and
creating a separate selected list information file and a separate logical imaging summary file outside the logical imaging file,
creating a report file, in which completion of logical imaging is recorded, based on the logical imaging file, the selected list information file, and the logical imaging summary file; and
outputting the logical imaging file to the user interface output device for analysis by a user,
wherein storing the selected file list information comprises:
creating a logical imaging file corresponding to a total size of the selected files;
formatting the created logical imaging file by loading a predetermined system configuration into the created logical imaging file;
storing the selected files in the formatted logical imaging file and information about the list of the stored selected files; and
generating hash values for integrity verification of the logical imaging files, wherein the hash values comprise a first hash value for respective selected files and a second hash value for whole contents of the selected files, wherein:
the logical imaging file, the selected list information file, the logical imaging summary file and the report file are provided to an investigator, and
the selected list information file and the report file are provided to a suspect,
integrity of the logical imaging file and the logical imaging summary file is verified using information recorded in the selected list information file, which include selected file list information identical to that recorded in the logical imaging file and the first hash values for respective selected files, and
integrity of the logical imaging file, the selected list information file, and the logical imaging summary file is verified using information recorded in the report file, which include a third hash value for the logical imaging file, the second hash value for whole contents of the selected files, and a fourth hash value for the selected list information file,
the predetermined file system structure is one among the formats including exFAT, FAT32, or NTFS,
the extension of the created logical imaging file is .dd or .d01, and
the selected list information, in which selected file information is recorded, is created and stored in the form of snapshot.txt in a formatted logical imaging file,
wherein the report file is configured such that principal information of a target system, which includes system information, device information, and artifact information, and information about an evidence image and extraction list, which includes a logical imaging time, the third hash value for the logical imaging file, the second hash value for whole contents of the selected files, and the fourth hash value for the selected list information file, are recorded in the report file.

6. The logical imaging apparatus of claim 5, wherein the logical imaging file includes a metadata storage area and an actual data storage area for the selected files.

7. The logical imaging apparatus of claim 6, wherein the processor is configured to perform, in storing the selected files in the formatted logical imaging file:
repeatedly performing an operation of generating and storing metadata in the metadata storage area and storing data in the actual data area based on selection of the selected files.

8. The logical imaging apparatus of claim 5, wherein the logical imaging summary file stores basic information about a case, the third hash value for the logical imaging file, the second hash value for whole contents of the selected files, and a fourth hash value for the selected list information file.

* * * * *